June 20, 1944.    H. J. MURRAY    2,351,628
AUTOMATIC CHANGE SPEED POWER TRANSMISSION MECHANISM
Filed Aug. 21, 1940    2 Sheets-Sheet 1

INVENTOR
Howard J. Murray

June 20, 1944.    H. J. MURRAY    2,351,628
AUTOMATIC CHANGE SPEED POWER TRANSMISSION MECHANISM
Filed Aug. 21, 1940    2 Sheets-Sheet 2

INVENTOR
Howard J. Murray

Patented June 20, 1944

2,351,628

UNITED STATES PATENT OFFICE 2,351,628

AUTOMATIC CHANGE SPEED POWER TRANSMISSION MECHANISM

Howard J. Murray, New York, N. Y.

Application August 21, 1940, Serial No. 353,441

12 Claims. (Cl. 74—293)

The present invention relates in general to an automatic torque converting power transmission mechanism, and specifically relates to a device for effecting and affecting universal drive relations between driving and driven members of a power transmission device.

One of the objects of the present invention is to provide a simple form of mechanism arranged to derive torque converting power from the driving member through drive control mechanism and thence employ the said derived power to control the drive control mechanism and thereby effect and affect the driving relation of the said members.

A further object of the present invention is to provide an automatic multi-speed drive transmission mechanism with the parts arranged so as to be torque responsive thereby to effect a plurality of positive speed-torque drive relations and to effect a combined slip and positive speed-drive relation between the said positive speed-drive relations.

An additional object of the present invention is to employ a plurality of fluid drive control means individually and collectively in a torque responsive manner so as to effect the transmission of power from a driving member to a driven member at various positive speed-torque drive relations.

A still further object of the present invention is to provide a combination of torque responsive drive control elements which will become operative one after the other according to the load torque on the driven member.

A still additional object of the present invention is to provide a plurality of self-acting fluid couples arranged to become torque responsive one after the other according to the torque load on the driven member thereby to sequentially effect a plurality of slip and non-slip drive relations between the power means in accordance with the torque load on the driven member.

The invention also contemplates the use of a plurality of self-retarded control couples in turn remotely controlled under such conditions that the members may be placed in positive drive relations independently of the said couples.

The present invention is a development of the disclosure included in my U. S. Patent Serial No. ,208,224 issued July 16, 1940, entitled Power ransmission torque converting device.

While the present invention is obviously capable of use in any location wherein it is desired to ransmit power from one member to another, the resent invention is particularly applicable to a ower transmission device for use in connection with automotive vehicle construction, and it is in this connection that embodiments of the present invention will be described in detail.

Accordingly the present disclosure includes a plurality of torque converting means for effecting slip and non-slip drive relations during periods of different torque loads on the driven member without mechanical friction or mechanical shocks.

In one embodiment of the present invention the fluid control elements of a plurality of drive control mechanisms are arranged to permit a plurality of slip and non-slip drive relations between the driving and driven members according to the load torque on the driven member, and in another embodiment the slip and non-slip drive relations may be automatically superseded by mechanical clutching means according to the torque load on the driven member. In still another embodiment the said slip and non-slip drive relations may be superseded by manually actuated clutching means.

According to the present disclosure the fluid control losses are much smaller than the fluid control losses under similar conditions for the combination of means disclosed in the above noted U. S. Patent.

In the following description and in the claims, parts will be identified by specific names for convenience of expression, but they are intended to be as generic in their application to similar parts as the art will permit.

Figure 1:
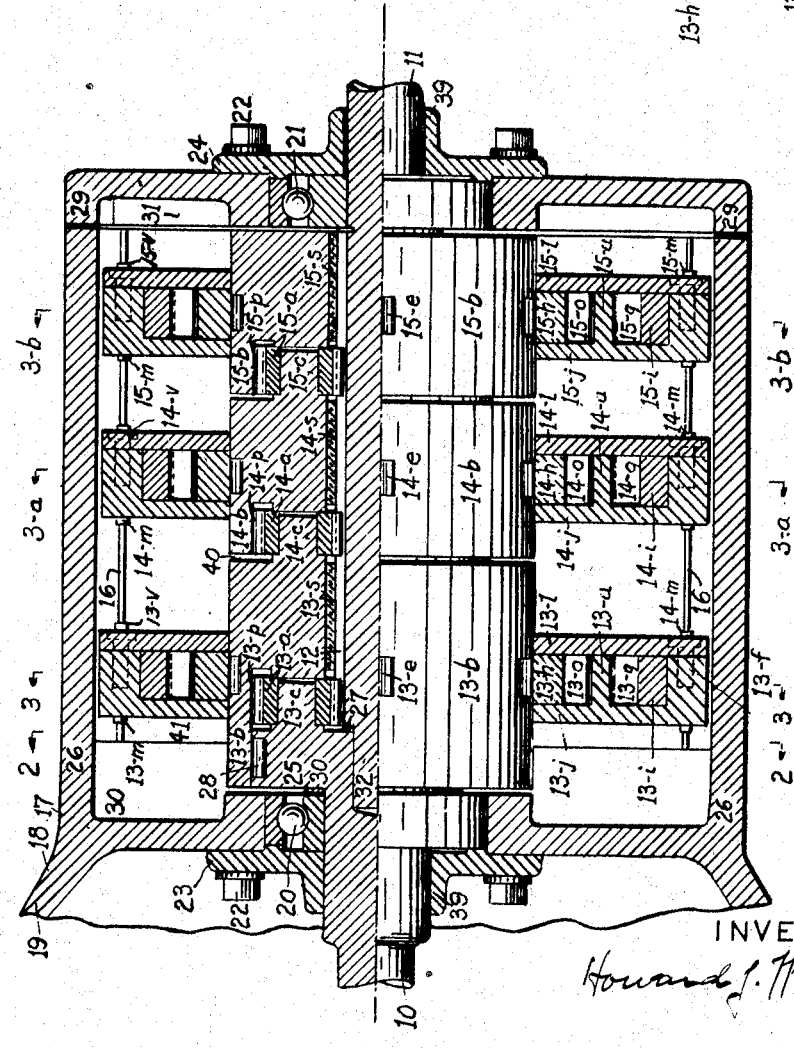
Figure 1 is an embodiment of the present invention partly in vertical section taken axially of the main shaft.

There is shown by Figure 1 of the drawings a novel drive control organization and associated power transmission elements collectively constituting a torque converting transmission mechanism and including a pair of power shafts 10 and 11 disposed in axial alignment with their adjacent ends including the reduced portion 32 of the shaft 11 interfitted to provide proper bearing surfaces.

The power shafts 10 and 11 are mounted for independent rotary movement respectively in suitable bearings 20 and 21. While either of these power shafts 10 and 11 may be considered as the driving member of the mechanism, for the purpose of this description, it will be considered that the shaft 11 is the normal driving member, and is operatively connected to be driven from a source of power (not shown) such as an internal combustion engine.

Accordingly shaft 10 is regarded as the normally driven member, and is, operatively connected to whatever mechanism (not shown) it is desired to drive.

Figure 3:
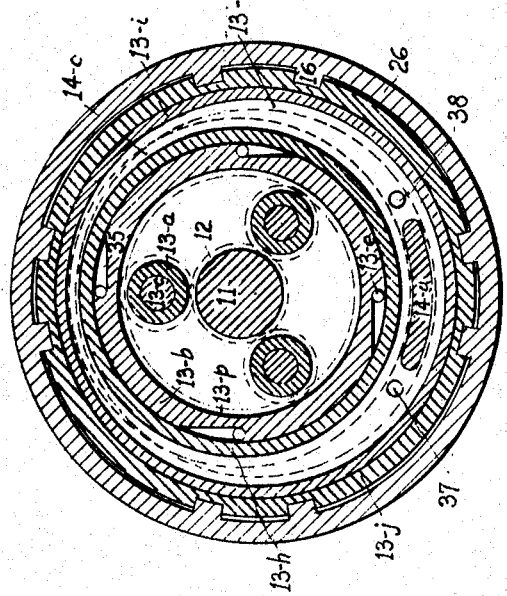
Figure 3 is a transverse sectional view taken upon the line 3—3 of Figure 1 looking in the direction indicated by the arrows.

The shaft 11 is preferably made of a good quality of steel and formed with sun teeth or spines 12 to operatively receive a plurality of groups of planet gears 13—a, 14—a and 15—a (see Fig. 3) forming together with the teeth 13—p, 14—p and 15—p of the annular gears 13—b, 14—b and 15—b and the sun teeth of the member 11, a plurality of differential speed drive sets all connected in speed driving relation with the driven member 11. One of the sets (see left hand set) in driving relation with the normally driving member 10.

The planet gears 13—a, 14—a and 15—a are rotatably supported and positioned by the bearing portions 13—c, 14—c and 15—c of the annular gears 13—b, 14—b and 15—b so as to be constantly in mesh with the sun teeth 12 of the member 11, and to revolve therewith.

The annular gears are positioned and supported on the splined bearings 13—s, 14—s and 15—s in turn supported by the teeth 12 of the member 11.

With this arrangement it is evident that each planet gear is constantly in mesh with portions of the sun teeth 12 and the teeth of one of the annular gears. It is also evident that a plurality of separate sun gears 12 could be assembled on the normally driven shaft 11.

Power may be transmitted by and between the power members 10 and 11 through a plurality of power transmission paths and each of these paths will act as a means to transmit power in some relation to the degree of retardation of the individual or collective rotation of the said differential sets.

A plurality of fluid pump elements are mounted on the annular gears. Thus element 13—h is mounted on annular gear 13—b. 14—h is mounted on annular gear 14—b, and element 15—h is mounted on gear 15—b. The elements are normally loosely mounted on the gears. The annular gears are formed with cammed surfaces 35 so as to receive the clutch rollers 13—e, 14—e and 15—e. The element 13—h is provided with fluid teeth 13—o. The element 14—h is provided with teeth 14—o, and the element 15—h is provided with the teeth 15—o.

The mechanism is provided with a casing 26 formed with a bell portion 18 and with the splines 16 to position and hold against rotation a plurality of pump casings 13—j, 14—j and 15—j and associated casing end members 13—l, 14—l and 15—l. Pump elements 13—i, 14—i and 15—i are loosely mounted in the casings as shown by Figure 1 so as to be in pumping mesh relation with the pump elements 13—h, 14—h and 15—h by means of the teeth 13—q, 14—q and 15—q. The casing 13—j is formed with the tongue 13—u. The casing 14—j is formed with the torque 14—u, and the casing 15—j is formed with the tongue 15—u (see Figure 1).

Figure 2:
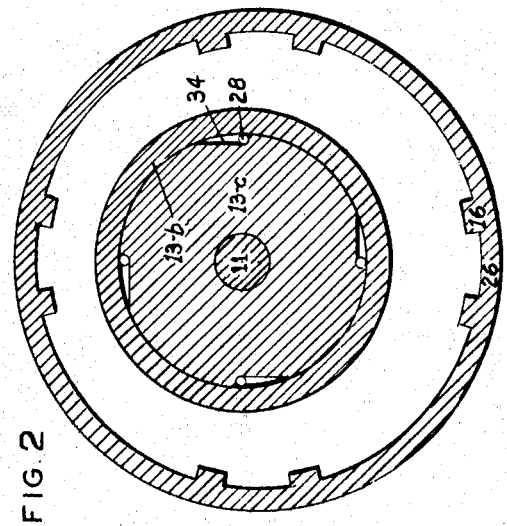
Figure 2 is a transverse sectional view taken upon the line 2—2 of Figure 1 looking in the direction indicated by the arrows.

The pump casings are also formed with openings 72 and 38 (see Figure 7) and with a fluid valve element 37 secured by the bolts 60. The casings are secured against excessive axial movement by means of the locking rings 13—m, 14—m and 15—m. The member 10 is formed at its enlarged portion 25 with a plurality of depressions 34 to receive the unidirectional clutch rollers 28 (see Figure 2).

Figure 4:
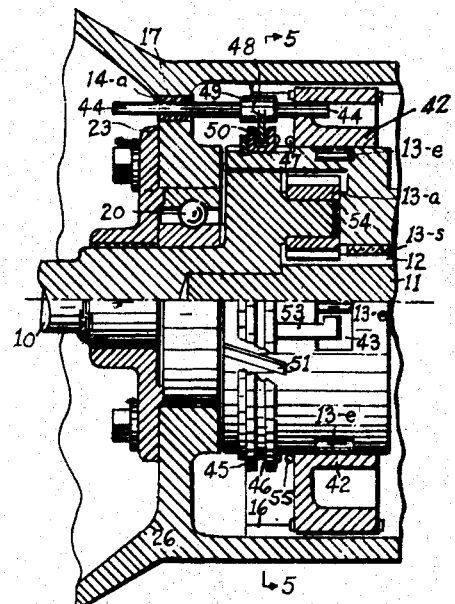
Figure 4 is another embodiment of the present invention partly in vertical section taken axially of the main shaft.

By means of Figure 4 there is shown a modification of the means of Figure 1. In this arrangement the annular gear 13—b of Figure 1 is modified as annular gear 54 of Figure 4 to include the depressions 43 formed so that the rollers 13e may be bidirectional. A shift collar 45 with a shift slot 46 and fingers 56 (see Figure 5) is slidably mounted on the annular gear 54 for rotation therewith. A shift finger 48 is formed on the member 49 securely attached to the shift rod 44 guided in its axial movement by openings in the casing 27 at the portion 17 and also by an opening in the member 42.

Figure 9:
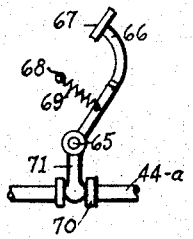
Figure 9 is a diagrammatic view of the means for remotely controlling the drive control means of Figure 4.

The shift rod 44 is conventionally extended to the rod 44—a of Figure 9 operatively attached to the arm 71 formed to rotate about the shaft 65 with the conventional brake control lever 66 and the pedal 67 associated with the conventional spring 69 attached to the pin 68. A supplemental spring 55 is positioned between the collar 45 and the member 42.

Figure 6:
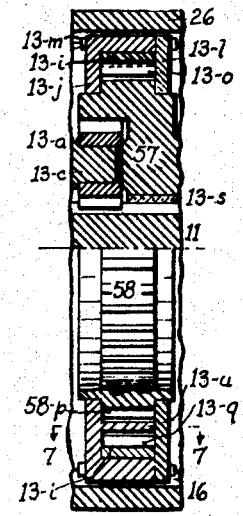
Figure 6 is still another embodiment of the present invention partly in vertical section taken axially of the main shaft.
Figure 14:
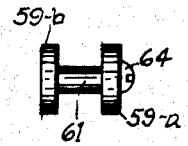
Figure 14 is a side view of the valve means of Figures 11 to 13 inclusive.

By means of Figure 6 there is shown still another modification of the means of Figure 1. In this arrangement the clutch rollers 13—e (see Figure 3) and the depressions 35 are not employed and the pump element 13—h (see Figure 1) is formed integral with the annular gear 13—b. Thus the element 57 of Figure 6 includes the pump teeth 13—o. While only one differential speed set is shown, it is understood that the same modification may be applied to all the differential sets shown by Figure 1. The modification shown by the means of Figure 4 associated with the shift rod 44 may also be employed with the modification of Figure 6.

Figure 7:
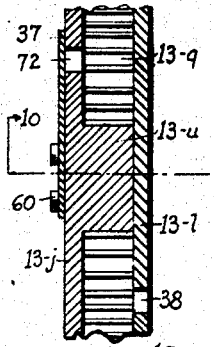
Figure 7 is a horizontal sectional view taken upon the line 7—7 of Figure 6 looking in the direction indicated by the arrows.
Figure 8:
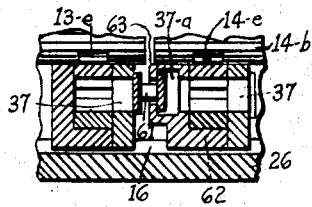
Figure 8 is a view of a modification of the means of Figure 1 in partial vertical section taken axially of the main shaft.

By means of Figure 8 there is shown means for operatively associating the fluid control valves as 37 of Figure 7 so as to operatively associate the differential sets through the fluid valves. In this arrangement the valve of one set is operatively associated with a valve of the adjacent set so that the fluid pressure of one pump may be employed to affect the fluid pressure of the pump fluid of an adjacent set. The valves 59a and 59—b are connected by means of the member 61 to provide for operative valve relation as hereinafter described.

Figure 10:
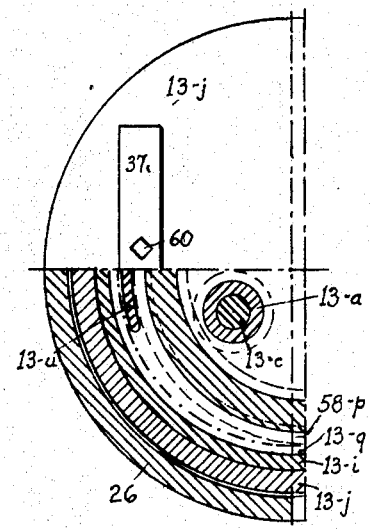
Figure 10 is a side view partially in sectional elevation taken along the line 10—10 of Figure 7 looking in the direction indicated by the arrows.

By means of Figure 10 a side view of the valve cover 37 of Figure 7 and its positioning means are shown. This view in partial sectional elevation also indicates the relation of the valve openings 72 and 38 to the pump teeth 58—p and 13—q (see Figure 6).

Figure 13:
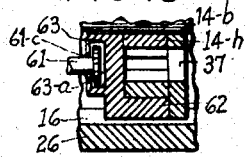
Figure 13 is a side view in partial sectional elevation of the means of Figure 12 looking in the direction indicated by the arrows along the line 13—13.
Figure 11:
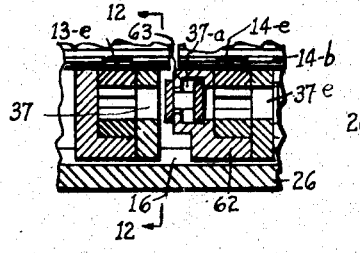
Figure 11 is a sectional view of the means of Figure 8 showing the valve parts of Figure 8 operated to a different position.
Figure 12:
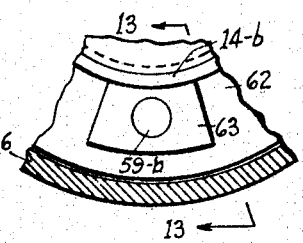
Figure 12 is a side view of the valve parts of one of the pumping units of Figure 11 taken along the line 12—12 of Figure 11 looking in the direction indicated by the arrows.

Figures 11 to 14 inclusive show sectional and end views of the operative relation of the valves 59—a and 59—b. The two said valves are operatively associated by the stem 61 and is moved axially by fluid pressure to the positions shown by Figures 8 and 11. In Figures 12 and 13 the projection 63 and the opening 63—a as well as the valve 59—a are shown in different operating relations.

In operation, let it be assumed that the source of motive power (not shown) is connected to the normally driven member 11 of Figure 1 by means of the conventional foot clutch as commonly found on self-propelled vehicles, although it is possible according to the present disclosure to directly connect the member 11 directly to the source of power.

Let it be further assumed for the purpose of this description that the source of power when connected to the member 11 will rotate the same clockwise when viewed from the right hand end of the means of Figure 1. The device to be driven such as an automotive vehicle, is assumed to be connected to the normally driven member 10 through a conventional reversing unit (not shown) and that the member 10 is normally driven in the same direction as the member 11.

The transmission casing including the portions 26 and 29 is well filled with a suitable fluid, and prevented from leaking out by means of the end members 23 and 24 formed to receive the fluid retaining material 39. The members 23 and 24 are attached to the transmission casing by means of the bolts 22.

As hereinbefore stated the present invention is a further development of the invention disclosed in Patent No. 2,208,224, and this patent in turn is a further development of the disclosure in my U. S. Patent No. 2,150,938 issued May 21, 1939. The arrangement of the sun, planet and annular gears are similar in the present disclosure and in the said patents. It is obvious that no additional teaching will be obtained by duplicating such teaching in the application, insofar as the differential speed drive relations of the said sun, planet and annular gears are concerned.

The means of Figure 1 may be assembled in several ways. It is suggested that the member 10 be first assembled with the bolts 22 in place, then the pumping mechanisms may be assembled complete by means of the bolts 13—v, 14—v and 15—v holding the casings 13—j, 14—j and 15—j and 13—l, 14—l and 15—l and the pump elements in operative relation. The left end lock ring is moved in the slots cut in the splines 16 of the transmission casing 26. The left end pump mechanism is moved along the splines 16 to the ring 13—m. The other lock rings 14—m and 15—m and the other pumps are similarly installed so as to be spaced apart as shown on Fig. 1. Next the sun, planet and annular gears are installed on the normally driven member 11, and the reduced portion 32 of the member 11 is moved into the member 10 as the member 11 is slowly rotated clockwise as viewed from the right hand end of the means of Figure 1.

With the shaft or member 11 rotating at constant speed (for the purpose of this description) and without any load torque on the member 10, all of the sun, planet and annular gears and the members 10 and 11 will tend to rotate at the same clockwise speed about a common axis. The pump elements 13—h, 14—h and 15—h will not rotate because the roller clutches 13—e, 14—e and 15—e will be rendered inoperative. There will be no pumping action because there will be no relative action between the pumping gear teeth 13—o and 13—q, 14—o and 14—q, and 15—o and 15—q. All of the said sun, planet and annular gears will rotate integral about a common axis.

Now let it be assumed that the engine upon the vehicle on which the transmission has been installed has been started and is running at constant speed. Also that the transmission is completely assembled and properly filled with a suitable fluid. With the member 10 connected to the rear wheels and the foot clutch let "in" a load torque will be placed on the member 10. The clockwise speeds of the annular gears 13—b, 14—b and 15—b will decrease. The clockwise speed of the annular gear 15—b will decrease faster than the clockwise speed of the annular gear 14—b in turn decreasing faster clockwise than the annular gear 13—b. The clockwise speed of annular gear 15—b will eventually reach zero. Up to this time, the pump gear 15—h has not been rotated. As the load torque increases, the annular gear 15—b will be rotated counter-clockwise. The roller clutches 15—e will be moved into clutching position, and the pump gear 15—h will be rotated sufficient to create a fluid pressure against the relief valve 37 (Figure 7 is common to all the pumping mechanisms of Figures 1, 4 and 6).

If the load torque is not sufficient to cause the gear 15—b to actuate the pump to create fluid pressure enough to open the valve 37 the gear 15—b will be held approximately stationary. This holding action will of course depend on the type of pump employed. If a plunger type of pump is actuated by the teeth 15—o the annular gear will be held at rest (it is hereby understood that this disclosure is not limited to any particular type of fluid pump, and that the actual type of pump may be of any known form best adapted to the manner of and the purpose for which the device is installed and operated). In this event the driving member 11 will be forced to drive the member 10 in a positive manner at the speed-torque drive relation determined by the arrangement of the annular gearing. The holding action will be mainly that of a static force.

If the load torque on the driven member 10 continues to increase, the reaction of the annular gear 15—b will eventually be able to operate the associated pumping elements to create fluid pressure to overcome the relief valve 37, and a pumping action will exist as the speed of the annular gear 15—b increases counter-clockwise. The fluid pressure against the relief valve 37 must always be greater than that for which it is set in order to force it open. Thus as the counter-clockwise speed of the annular gear increases the holding action of the pump will also increase and the driving member 11 will be forced to drive the member 10 at increased torque relation. The speeds of the annular gears 14—b and 13—b have also been decreasing clockwise as the counter-clockwise speed of the annular gear 13—b increased.

With still further increase of torque load on the member 10 the annular gear 14—b will come to zero speed. As the annular gear 14—b reverses its direction of rotation, the clutch rollers 14—e will drive connect the annular gear 14—b to the pump gear member 14—h. The second pump will now become operative to compress fluid against its relief valve 37. The second relief valve associated with the pumping member 14—h will be set to resist a higher fluid pressure than the relief valve associated with the pumping member 15—h.

As the 14—h relief acts to retard the associated pump elements its holding action will be added to the holding action of the 15—h relief valve. As the load torque on the member 10 increases there will be a hunting action against the annular gears because the relief valves will remain closed over a range band of fluid pressure increase, and the annular gear 14—b will be held at rest as the annular gear 15—b continues to rotate counter-clockwise and the annular gear 13—b still rotates clockwise. Thus a second speed-torque positive drive relation will be effected between the driving member 11 and the driven member 10 according to the load torque on the said driven member 10. This is true, because the reaction of the planetary gearing is proportional to the load torque, and the pumping action is proportional to the reactions of the annular gears. The holding action on the annular gear 14—b is static, and no power factor is involved. The holding action on the annular gear 15—b is a resultant of both static and kenetic forces.

With still further increase of load torque on the driven member 10, the clockwise speed of the annular gear 13—b will reach zero as the annular gears 14—b and 15—b are now both rotating counter-clockwise with the associated relief valves open to different degrees.

When the annular gear 13—b starts to rotate counterclockwise the third pump will be connected by means of the rollers 13—e and the annular gear 13—b and the pump member 13—h will be in compression status. The third relief valve operatively associated with the pump member 13—h will be set for a higher fluid pressure than the relief valve operatively associated with the pump member 14—h. Thus a third hunting action will occur and the members 10 and 11 will be placed in a third positive drive relation as the third relief valves holds the third pump over the third relief pressure band.

It should be noted at this time that altho there are three positive or non-slip drive relations effected as the load torque on the member 10 has increased, there has also been slip-drive intervals between the non-slip drive intervals. The members 10 and 11 have also been in drive relation during these slip-drive intervals. This slip-drive holding action has also increased in accordance with the load torque on the driven member 10. Thus there has been no shock or violent change in the holding action of the pumps and therewith no violent change in the drive relations of the members 10 and 11. In fact the holding action has occurred according to the torque load on the driven member 10. The holding for fluid control action is automatically balanced so as to be proper for the instantaneous load torque, because the holding action is a function of the load torque. If the load torque now continues to increase, the pump member 13—h will now be rotated counter-clockwise and the torque relations of the members 10 and 11 will still further increase. In some installations of the device this increase of torque relations may not be desirable.

In this event a fluid pump mechanism will be removed from association with the annular gear 13—b and a simple roller clutch means installed as shown by Figure 4.

The member 42 is installed in the place of the pump casings 13—j and 13—l. In this event, when the annular gear 13—b starts to rotate counter-clockwise the clutch rollers 13—e will be moved into clutching position and the annular gear 13—e will be held at rest. The member 11 will now be forced to positively drive the member 10 at the speed-torque ratio determined by the planetary gearing. With this arrangement, the annular gears 15—b and 14—b will be fluid controlled and the annular gear 13—b mechanically controlled. The speed ratio for the greatest difference of speed between the members 10 and 11 will be limited.

When the torque load on the driven member 10 decreases, the strain on the clutch rollers 13—e will decrease and as the annular gear 13—b starts to rotate clockwise, the rollers 13—e will be released with either the mechanical member 42 for the pump member 13—h of Figure 1. At the same time the counter-clockwise rotation of the annular gears 14—b and 15—b will decrease.

Figure 5:
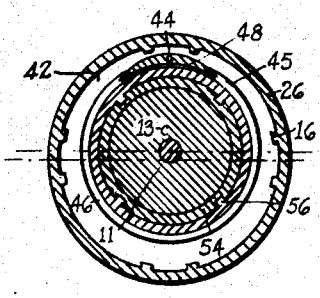
Figure 5 is a transverse sectional view taken upon the line 5—5 of Figure 5 looking in the direction indicated by the arrows.

Eventually the clutch rollers 14—e will be released as the annular gear 14—b starts to rotate clockwise, and finally the annular gear 15—b will reach zero speed and reverse and the rollers 15—e will be released. As the rollers are sequentially released the associated fluid pumps will become inoperative. The pumps are sequentially released according to the torque on the driven member 10. The action is entirely automatic and without any attention on the part of the vehicle operator. When the mechanical member 42 of Figure 5 is employed the efficiency of the device will be increased. The pumps may be connected to closed fluid conducting lines arranged to conduct the fluid outside of the transmission casing as shown by Figure 6 of my U. S. Patent 2,208,224. The valves may also be placed outside the casing as shown by the drawings of Patent 2,208,224. However the pumps of Figure 1 are shown with simple openings with simple conventional fluid control valves arranged so that the same lubricating fluid used for the transmiss-gearing may be used as a fluid control medium. In addition, any leakage from the pumps will remain in the transmission and thus be used over again. Because of this novelty, the fittings will not have to be close, and the danger of low oil supply is eliminated.

The efficiency of the device may be still further increased by operatively associating the valves of one pump with the valves of another pump. By means of Figure 8 there is shown a method of operatively associating the valve 59—a with the valve 59—b (see Figure 14). The valves may be both inlet or outlet valves, or one of the valves may be the relief valve of one pump mechanism, and the other means for controlling the oil intake of another pump mechanism. If the stem 6L is of such a length as to hold the valves at closed positions as shown by Figure 8 the valve 59—a may be considered as the relief valve associated with the pump element 14—h. As the impressed torque on the driven member 10 increases, the reversed speed of the gear 14—b will increase and the clockwise speed of the gear 13—b will decrease to zero and thence rotate counterclockwise (see Figures 1, 4 and 6). The fluid pressure due to the rotation of the gear 14—b is transmitted to the valve element 59—a to keep the valve elements 59—a and 59—b seated as shown by Figure 8. Eventually (with continued torque increase on the member 10), the fluid pressure in the opening 37 will be sufficient to axially move the valves 59—a and 59—b and the stem 61 against the fluid pressure caused by the gear 14—b as shown by Figures 11 and 13. This axial movement will of course be varied as to time and extent by the relative active pressure areas of the openings 37 and 61—c.

With the operating valve positions of Figure 11, the fluid pressure due to gear 13—b would be relieved and the fluid pressure due to the gear 14—b maintained to tend to hold the gear 14—b as hereinbefore explained. For the valve positions of Figure 13 both pressures due to gears 13—b and 14—b would be relieved. Thus the valve 59—b acts as a supplementary valve to the valve 59—a to reduce the pressure of the fluid in the faster rotating pump and thus throw more of the control load on the slower moving pump.

If the stem 61 is longer the valve 59—b will be shown as open. If the valve 59—b is now a fluid inlet control valve, it is obvious that an increase of pressure back of the valve 59—a could act to shut off the fluid supply to the pump including the element 14—h and reduce its effort to maintaining a few pounds of vacuum.

Thus the valves of the device may be combined to reduce molecular loss of the fluid medium according to the manner of and the purpose for which the device will be installed and operated.

When the normally driven member 10 of the means of Figs. 1 and 5 becomes the driving member, the annular gears will all tend to rotate faster than the member 10. If there is no load torque on the now driven member 11, the gears of Figure 1 will tend to rotate at a common speed about a common axis. However any appreciable load torque will tend to react on the planetary gearing to cause the annular gear 15—b to rotate clockwise faster than the annular gear 14—b, and the gear 14—b to rotate clockwise faster than the gear 13—b. In order to maintain the differential relation of the planetary gearing it is obvious that such action will cause the driven member 11 to rotate slower than the driving member 10.

Applied to the automotive transmission, this action would usually occur when the vehicle is coasting or the vehicle is driving the engine against compression. If the clutch rollers 28 (see Figures 1 and 2) are positioned in the unidirectional depressions 34 formed in the portion 25 of the now driving member 10, these rollers will be inactive at all times except when the annular gear 13—b tends to rotate clockwise faster than the now driving member 10. As the member 10 becomes the driving member, the annular gear 13—b will tend to rotate clockwise faster than the portion 25 and the rollers 28 will be moved into clutching position. All the planetary gearing will rotate at a common speed, and the members 10 and 11 will be in positive drive relation. This is the conventional drive relation in which the ordinary automotive vehicle is operated down ordinary grades.

Any number of fluid pumps as shown on Figure 1 may be employed. The more pumps used the less speed-drive change between pump connections. The gear ratio of the planetary gearing may be tapered so that only a small difference in speed between the members 10 and 11 will exist as the annular gear 15—b reverses its direction of rotation.

With proper design, the power line between the member 10 and the vehicle wheels may be arranged so that when annular gear 15—b is held at rest, the engine and vehicle will be in conventional direct drive, when annular gear 14—b is held at rest conventional intermediate speed drive relations will be effected, and when the annular gear 13—b is held at rest (either by mechanical or fluid means) conventional low speed drive relations will be effected.

If direct drive relations between the vehicle and the engine are not sufficient in emergency, such as traversing an unusual down grade, I provide means co-incidentally actuated with the vehicle controls in the normal act of operating the vehicle.

Figure 4 shows a modified annular 15—b gear designated by the numeral 54 formed with curved slots 51 to receive the fingers 56 of a shift collar 45 to which is attached a clutch roller barrier arm 53. The clutch roller 13—e is positioned in a bidirectional depression 43 formed in the annular gear 54. Normally the clutch roller 13—e is unidirectional and acts only when the annular gear rotates counter-clockwise as the member 11 is the driving member. When the member 10 becomes the driving member the clutch roller of Fig. 4 will normally remain inoperative, and thus acts as does the roller clutches 13—e of Figure 1.

When the operator of the vehicle is unable to check the increasing speed of the vehicle due to the direct drive action of the rollers 28 (see Figure 2) he will depress the conventional brake control pedal 67 of Figure 9 to operate the arm 66 and thus the speed control arm 71 to move the rod 44 connected to the rod 44 of Figure 4 to move the shift finger 48 and thereby the shift collar 45 against the resetting spring 55. The fingers 56 will rotate the collar and therewith the barrier arm 53 to cause same to move away from the clutch roller 13—e to permit same to move into clutching position. The transmission device will thus cause the now driving member 10 to rotate the member 11 at a faster speed than its own and thus increase the compression braking effect of the engine to decelerate the vehicle. Any manually actuated part of the car or vehicle may be employed to selectively move the rod 44—a with the same effect. Or a special control knob may be placed on the steering wheel column convenient to the vehicle operator. In this event the clutch rollers 13—e would not be co-incidentally controlled, and the brake control mechanism would have no effect on the transmission operation.

Thus, according to the present disclosure, I provide a highly efficient fluid control organization automatically deriving control power from the driving member according to the load torque on the driven member. In addition the organization automatically effects a plurality of predetermined positive drive relations between the driving member and the driven member at different torque relations without shock or jar.

By means of Figure 6 there is shown a combination of means in which no roller clutches are employed for the fluid pumps. The annular gears are a portion of the pumps. Thus the annular gear 57 is formed with teeth 58—p at the portion 58 (same for all pumps used in this modification). The other elements of each pump are similar to the pump elements 13—j, 13—l, 13—u, 13—i and 13—q of Fig. 1. The relief valves may be set to hold the annular gears when reversing with the member 11 driving as explained for the valves of figure, but the relief valves normally will also act to cut off the oil supply when the annular gears are rotating clockwise.

In this event the pumps cannot pump oil when the annular gears are rotated clockwise, and the effort will be limited to creating a vacuum of a few pounds.

Or the valves may be associated as shown in Figure 8 to effect many desired operating results according to the manner of and the purpose for which the device is installed and operated.

The roller clutches 28 may also be employed with the means of Figure 6 as hereinbefore described for the means of Fig. 1.

In the same manner the means shown by Figure 5 may also be employed with the means of Figure 6.

In conclusion, it will be understood that the present disclosure provides fluid control means for automatically effecting and affecting slip and non-slip drive relations at different speed-torque rations. That this automatic operation may be also affected manually. That both fluid and mechanical control means are provided for automatically deriving a small portion of the power transmitted between two power members thereby to control slip and non-slip transmission of power at a plurality of speed-torque relations.

That fluid drive control means are provided whereby a plurality of fluid pressures are sequentially produced and employed in a more or less static manner to create forces to cause one power member to drive another.

While I have shown and described and have pointed out in the annexed claims certain new and noval features of my invention, it will be understood that certain well known equivalents of the elements illustrated may be used, and that various other substitutes, omissions and changes in the form and details of the devices illustrated and in their operation may be made by those skilled in the art without departing from the spirit of my invention.

Having thus described my invention, I claim:

1. In a device of the class described, the combination of planetary gearing, a driving rotor and a driven rotor in drive relation, a plurality of bidirectional fluid control organizations, roller clutch means for drive connecting and disconnecting the organizations one after the other to the gearing in accordance with the load torque on the driven rotor, and fluid for the said organization.

2. In a device of the class described, the combination of drive and driven power members, drive means for maintaining a drive relation between the said members, a plurality of fluid control means including co-operatively associated check valves individually and collectively actuated according to the extent and direction of rotation of the said fluid control means, a plurality of sequentially actuated torque responsive clutch elements for selectively connecting and disconnecting the said control means individually and collectively to the drive means according to the torque load on the driven member, and a fluid for the said control means.

3. In a device of the class described, the combination of a pair of power members, drive control means operatively positioned to establish speed drive relation between the said members, fluid, and a plurality of separately mounted fluid control mechanisms each including a unidirectional fluid valve, certain groups of the said valves provided with common elements for co-operatively associating the valves of the said groups according to the extent and direction of rotation of the said mechanisms for individually and collectively causing the establishing action of the drive means, said control means including torque responsive elements for individually and collectively connecting and disconnecting the fluid control means and the said drive control means as a function of the torque load on the driven member.

4. In a device of the class described, the combination of a pair of power members, drive means for maintaining drive relation between the said members, fluid, and a plurality of fluid energizing and control means arranged to be selectively drive related to the said drive means, said fluid means including clutch elements positioned to selectively connect and disconnect the said control means and the drive means according to the torque load on the driven member and the speed of the driving member, further clutch elements positioned to positively drive relate the said members when the fluid means are connected, and still further clutch elements manually actuated for positively connecting the said members independently of the fluid means.

5. A device for causing micromatic torque conversion between a driving rotor, a driven rotor and planetary gearing, which includes means for supporting and positioning the said rotors and said gearing normally in constant drive relation about a common axis, a fluid, and fluid control means, said control means including torque responsive fluid control valve means for employing the fluid control means to retard the said gearing in a hunting manner thereby to force the driving rotor to micromatically drive the driven rotor positively at a plurality of speed drive relations varying from the said normal relation, said forced relations occurring in accordance with the torque load on the driven rotor.

6. In a gear control organization, the combination of a pair of power rotors and gearing in differential drive relation about a common axis, a drive control organization including a plurality of operatively separate fluid compressors and associated valve control elements, fluid for the said compressors, clutch means for individually drive relating the compressors to the gearing in accordance with the torque load on the driven rotor, further clutch means for positively drive relating the said rotors after the said compressors have been drive connected, and remotely controlled manually actuated clutch means for positively drive relating the said rotors independently of the said compressors.

7. In a device of the class described, the combination of speed gearing and drive and driven power rotors drive related to the gearing, a fluid, a plurality of fluid control mechanisms, clutch means for connecting and disconnecting the said mechanisms one after the other to the said gearing according to the torque load on the driven rotor, further clutch means for connecting the rotors in positive drive relation after the said mechanisms have been connected, and still further clutch means for positively drive connecting the said rotors when the said driving rotor becomes the driven rotor.

8. In a device of the class described, the combination of drive and driven members in drive relation, drive means for causing a desired speed drive relation between the said members, a plurality of fluid energizing mechanisms, fluid for the said mechanisms, a plurality of torque responsive clutch means for connecting the mechanisms to the drive means according to the torque load on the driven member, further torque responsive clutch means for automatically and positively drive relating the said members after the said mechanisms have been connected, and manually controlled clutch means for causing the said members to become positively drive related without regard to the action of the other said clutch means.

9. In a device of the class described, the combination of driving and driven power members, drive means including a plurality of planetary gears for maintaining a drive relation between the said members, a bidirectional fluid drive control mechanism including torque responsive fluid valves arranged for drive relating and unrelating the mechanisms one after the other to different elements of the said drive means according to the torque load on the driven member, and a fluid medium for the said mechanisms.

10. In a device of the class described, the combination of sun, planet, annular, drive and driven gears in drive relation, separate fluid control mechanism carried by each of the said annular gears, torque responsive clutch means for drive relating one of the said mechanisms and one of the said annular gears progressively according to the torque load on the driven gear and thence unrelating same according to the said torque, and fluid medium for the said mechanisms.

11. In a device of the class described, the combination of gearing, a driving rotor and a driven rotor in normal driving relation, a plurality of fluid gear pumps carried by the said gearing for torque responsive rotation therewith, a plurality of normally inactive clutch rollers operatively positioned between the said gearing and said pumps for effecting the said torque responsive rotation, a fluid for the said pumps, valve elements associated with the said pumps and actuated by the said fluid, and further remotely controlled clutch rollers for drive relating certain of the pumps and the gearing independently of the said normally inactive rollers.

12. In a device of the class described, the combination of a pair of power members, drive means for maintaining a normal drive relation between the said members, a fluid, a plurality of fluid control mechanisms including fluid valve elements actuated by the said fluid for progressively and sequentially fluid drive relating the said drive means and said mechanisms to vary the said normal drive relation, clutch elements operatively positioned so as to positively drive relate the said members after the said drive means and said mechanisms are all fluid drive related, and manually actuated means for disconnecting the said clutch means.

HOWARD J. MURRAY.